United States Patent
Piazza

(10) Patent No.: US 11,603,916 B2
(45) Date of Patent: Mar. 14, 2023

(54) SYSTEMS AND METHODS FOR MONITORING LUBRICATION OF A GEAR ASSEMBLY

(71) Applicant: GE AVIO S.R.L., Rivalta di Torino (IT)

(72) Inventor: Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 604 days.

(21) Appl. No.: 16/691,916

(22) Filed: Nov. 22, 2019

(65) Prior Publication Data
US 2020/0224758 A1     Jul. 16, 2020

(30) Foreign Application Priority Data
Jan. 16, 2019  (EP) .................................... 19425002

(51) Int. Cl.
*F16H 57/04*     (2010.01)
*F16N 29/04*     (2006.01)
(Continued)

(52) U.S. Cl.
CPC ......... *F16H 57/0405* (2013.01); *F01M 11/10* (2013.01); *F02C 7/06* (2013.01); *F16C 19/52* (2013.01); *F16H 1/20* (2013.01); *F16H 1/36* (2013.01); *F16H 57/0486* (2013.01); *F16H 57/0495* (2013.01); *F16N 29/04* (2013.01); *G01M 13/04* (2013.01); *G07C 5/0808* (2013.01); *G07C 5/0825* (2013.01);
(Continued)

(58) Field of Classification Search
CPC ......... F01M 11/10; F02C 7/06; G07C 5/0808; G07C 5/0825

USPC ....................................................... 701/29.2
See application file for complete search history.

(56) References Cited

U.S. PATENT DOCUMENTS 2,457,757 A    12/1948 Rifenbergh
3,280,624 A    10/1966 Weinert
(Continued)

FOREIGN PATENT DOCUMENTS

CN    203348511 U  * 12/2013
CN    106948945 A    7/2017
(Continued)

OTHER PUBLICATIONS

Timo et al., "Multi-channel active gear pair vibration control with an electronically commutated motor as actuator," 2014, Publisher: IEEE.*
(Continued)

*Primary Examiner* — Tuan C To
(74) *Attorney, Agent, or Firm* — Venable LLP; Michele V. Frank

(57) ABSTRACT

Systems and methods of monitoring lubrication of a gear assembly during operation of a machine provide for receiving at a control system, a signal from a sensor indicative of a value obtained by the sensor for an electrical property of a circuit crossing the gear assembly operably coupled to the machine, ascertaining whether the value for the electrical property corresponds to a warning level for a condition of the lubricant film, and outputting a control command when the value for the electrical property corresponds to the warning level for the condition of the lubricant film.

20 Claims, 10 Drawing Sheets

(51) Int. Cl.
*G07C 5/08* (2006.01)
*F16H 1/20* (2006.01)
*F16H 1/36* (2006.01)
*F01M 11/10* (2006.01)
*F02C 7/06* (2006.01)
*F16C 19/52* (2006.01)
*G01M 13/04* (2019.01)

(52) U.S. Cl.
CPC .. *F01M 2011/1413* (2013.01); *F16C 2206/40* (2013.01); *F16C 2233/00* (2013.01); *F16C 2361/00* (2013.01); *F16N 2250/36* (2013.01); *F16N 2270/50* (2013.01)

(56) References Cited

U.S. PATENT DOCUMENTS

| | | | |
|---|---|---|---|
| 3,405,557 | A | 10/1968 | Sinke, Jr. |
| 3,522,524 | A | 8/1970 | Smith et al. |
| 4,321,753 | A | 3/1982 | Fusari |
| 4,544,526 | A | 10/1985 | Billings |
| 6,655,205 | B2 | 12/2003 | Bartelt et al. |
| 8,925,380 | B2 | 1/2015 | Fischer |
| 8,999,905 | B2 * | 4/2015 | Duggal ............... C10M 143/10 508/591 |
| 9,701,921 | B1 * | 7/2017 | Bennett ............ C10M 169/044 |
| 2003/0047386 | A1 | 3/2003 | Sherrington |
| 2003/0098691 | A1 | 5/2003 | Matsuyama et al. |
| 2013/0318940 | A1 * | 12/2013 | Parnin ...................... F02C 7/36 184/6.12 |
| 2014/0076661 | A1 * | 3/2014 | Xu ..................... F16H 57/0486 184/14 |
| 2014/0165589 | A1 * | 6/2014 | Cloft ...................... F01D 25/24 60/786 |
| 2014/0216003 | A1 * | 8/2014 | Phillips .................... F02K 9/64 60/39.08 |
| 2016/0376949 | A1 * | 12/2016 | Parnin ................... F01D 17/20 73/112.01 |
| 2017/0102292 | A1 * | 4/2017 | Mastro .................. G01B 7/144 |
| 2017/0114662 | A1 * | 4/2017 | Mastro .................. F02C 3/107 |
| 2017/0138922 | A1 | 5/2017 | Potyrailo et al. |
| 2018/0023414 | A1 * | 1/2018 | Hagen ............... G01N 33/2858 73/53.05 |
| 2018/0058570 | A1 * | 3/2018 | Osborn ............. F16H 57/0436 |
| 2018/0363723 | A1 * | 12/2018 | Heirendt .................. F16F 7/09 |
| 2020/0215905 | A1 * | 7/2020 | Ohtani ................... B60K 6/365 |

FOREIGN PATENT DOCUMENTS

| | | | | |
|---|---|---|---|---|
| CN | 207816969 | U | * | 9/2018 |
| CN | 108843778 | A | | 11/2018 |
| DE | 102016215099 | A1 | | 2/2018 |
| EP | 0159742 | A1 | | 10/1985 |
| EP | 1701049 | A1 | | 9/2006 |
| EP | 2299159 | A2 | | 3/2011 |
| EP | 3109414 | A1 | * | 12/2016 ............ F01D 17/20 |
| WO | WO-2014137692 | A1 | * | 9/2014 ............ F01D 25/18 |
| WO | WO-2014198280 | A1 | * | 12/2014 ........... F16D 48/062 |

OTHER PUBLICATIONS

Albahrani et al., A review of in situ methodologies for studying elastohydrodynamic lubrication, Sage Journals, vol. 230, Issue 1, 2016, pp. 86-110. (Abstract Only).

Bader et al., Capacitances and Lubricant Film Thicknesses of Grease and Oil Lubricated Bearings, Rolling Element Bearings II: Rolling Element Bearing Dynamics, STLE Atlanta, May 21-25, 2017, 4 Pages.

Schnabel et al., Monitoring of Running-in of an EHL Contact Using Contact Impedance, Tribol Lett, vol. 63, Issue 35, 2016, 10 Pages. https://doi.org/10-1007/s11249-016-0727-2.

* cited by examiner

SYSTEMS AND METHODS FOR MONITORING LUBRICATION OF A GEAR ASSEMBLY

PRIORITY INFORMATION

The present disclosure claims priority to European Patent Application 19425002.3 filed on Jan. 16, 2019.

FIELD

The present disclosure generally relates to gear assemblies and systems and methods for monitoring gear assemblies, including systems and methods of detecting wear, contamination, inadequate lubrication, and the like in gear assemblies such as epicyclical gear assemblies.

BACKGROUND

A gear assembly may incur wear or damage when lubrication becomes inadequate. Typically, a gear assembly receives lubrication intended to provide a lubricant film on gear surfaces that prevents the gears from contacting one another. However, sometimes the thickness of the lubricant film may be inadequate due to local or generalized pressure, temperature, viscosity conditions, or there may become interruptions in the lubricant film that may allow meshing gears to contact one another and/or that may generate excessive friction and potentially abrasive and/or adhesive wear. Additionally, sometimes contaminants may become present in the lubricant film, which may also damage the gear assembly.

Accordingly, there exists a need for systems and methods of monitoring lubrication of a gear assembly.

BRIEF DESCRIPTION

Aspects and advantages will be set forth in part in the following description, or may be obvious from the description, or may be learned through practicing the presently disclosed subject matter.

In one aspect, the present disclosure embraces systems for monitoring lubrication of a gear assembly during operation of a machine. An exemplary system may include a machine, and a gear assembly coupled to the machine via an input shaft. The gear assembly may include a first gear, an intermediate gear meshing with the first gear, a second gear meshing with the intermediate gear, and a lubricant supplied to the gear assembly so as to define a lubricant film separating the intermediate gear from the first gear and the second gear.

An exemplary system may further include a sensor and a control system. The sensor may be operably configured to obtain a value for an electrical property of a circuit crossing the gear assembly and to output a signal indicative of the value for the electrical property obtained by the sensor. The circuit may include the first gear, the intermediate gear, and the second gear. The control system may be operably configured to receive the signal from the sensor, to ascertain whether the value for the electrical property corresponds to a warning level for a condition of the lubricant film and to output a control command when the value for the electrical property corresponds to the warning level for the condition of the lubricant film, the electrical property correlating to the condition of the lubricant film.

In another aspect, the present disclosure embraces methods of monitoring lubrication of a gear assembly during operation of a machine. An exemplary method may include receiving at a control system, a signal from a sensor indicative of a value obtained by the sensor for an electrical property of a circuit crossing the gear assembly operably coupled to the machine. An exemplary method may further include ascertaining whether the value for the electrical property corresponds to a warning level for a condition of the lubricant film, as the electrical property may correlate to the condition of the lubricant film. An exemplary method may further include outputting by the control system, a control command when the value for the electrical property corresponds to the warning level for the condition of the lubricant film.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1A:
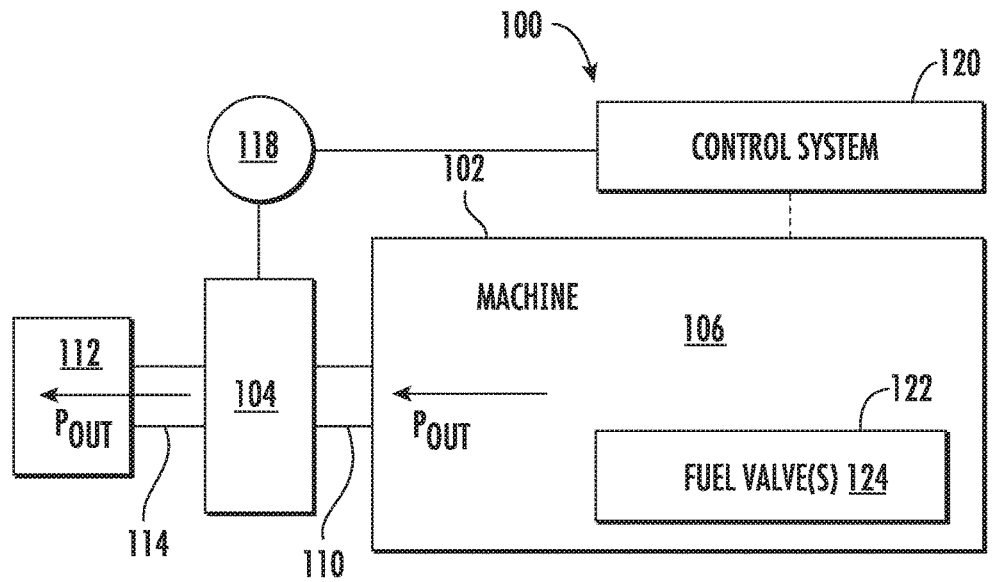
FIGS. 1A and 1B schematically depict exemplary engines with a lubrication monitoring system.

Repeat use of reference characters in the present specification and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally pertains to systems and methods of monitoring lubrication of a gear assembly. A gear assembly may typically include a lubricant film that separates the respective gears from one another at their mesh points. The presently disclosed systems and methods include one or more sensors configured to monitor one or more conditions of the lubricant film, including monitoring for adequate thickness of the lubricant film, monitoring for interruptions in the lubricant film, and monitoring for the presence of contaminants in the lubricant film. The sensors may monitor for such condition(s) by obtaining a value for one or more electrical properties for a circuit crossing the gear assembly that correlate to such condition(s).

The gear assembly may include at least three gears, such as an input gear, and idler gear, and an output gear. In an exemplary embodiment, the gear assembly may have an epicyclical configuration, such as may be the case for a fan drive gear system for a turbomachine engine. With an epicyclical configuration, the gear assembly may include a sun gear, a ring gear, and a plurality of intermediate gears operably configured as planetary gears located between the sun gear and the ring gear. The intermediate gears (e.g., the planetary gears) may be coupled to respective support structures such as pins, framework, or other structure associated with the gear assembly. The intermediate gears (e.g., the planetary gears) may be stepped or multi-stage gears (e.g., stepped or multi-stage planetary gears) with two or more intermediate gars or multi-stage gear structures. A bearing assembly that includes components formed of an electrically insulating material may be utilized such that the intermediate gears are electrically isolated from the support structure. In this way, the sensor may ascertain an electrical property of a circuit crossing the gear assembly without the circuit running to ground via the support structure. Suitable electrically insulating materials include silicon nitride, zirconium dioxide, aluminum oxide, and sialon. It will be appreciated that suitable electrically insulating materials may include other alloying elements. For example, a suitable silicon nitride composition may include about 85% to about 95% silicon nitride and about 5% to 15% other alloying elements.

Advantageously, by electrically insulating the intermediate gears (e.g., the planetary gears) from the support structure, a sensor may be configured to obtain a value for an electrical property of a circuit crossing the entire gear assembly, without requiring a separate sensor for each pair of meshing gears. The sensor may thereby output a signal which can be utilized by a control system to identify potential problems with the gear assembly or its lubrication, regardless of which particular gear or combination of gears may be associated with the potential problem. When a value for an electrical property corresponds to a warning level for a condition of the lubricant film, the control system may output a control command, such as to log a maintenance request, signal an alarm on a user interface, or even shut down a machine coupled to the gear assembly. Additionally, the presently disclosed system and methods may be utilized to confirm proper operation of a gear assembly during or after maintenance or servicing.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Figure 1B:
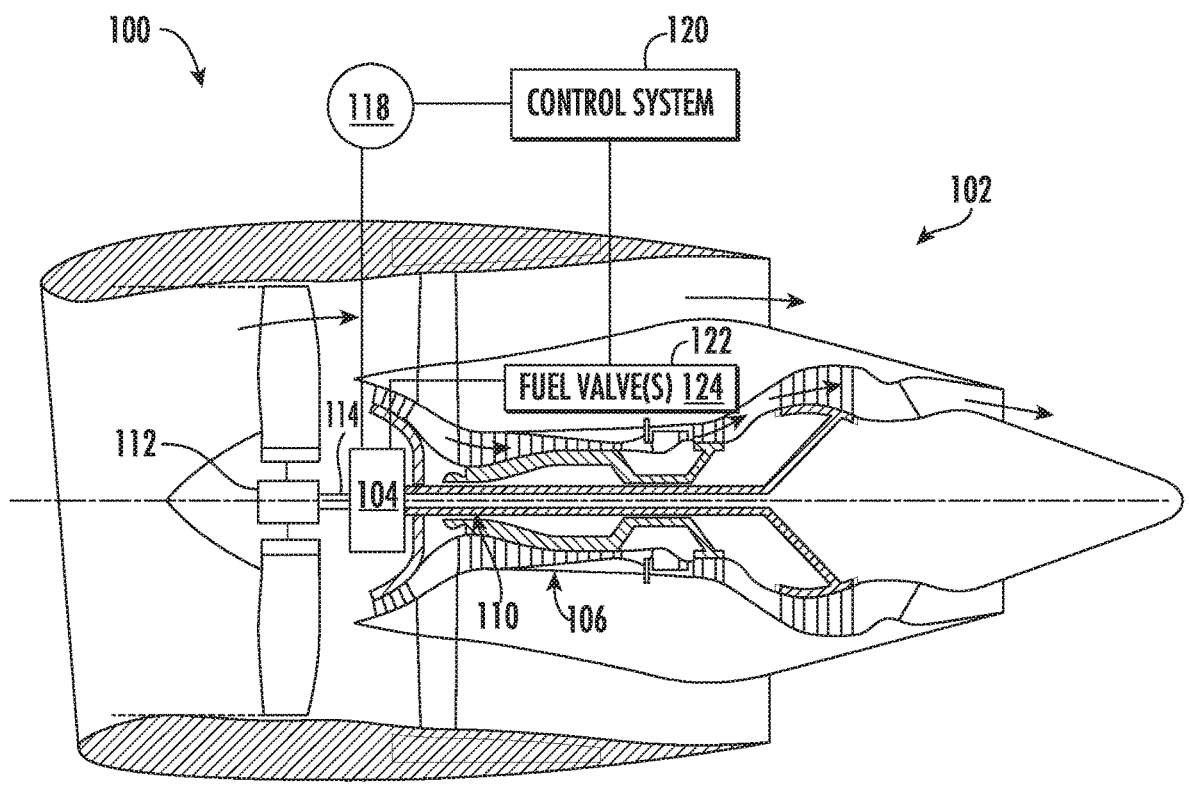
Figure 1C:
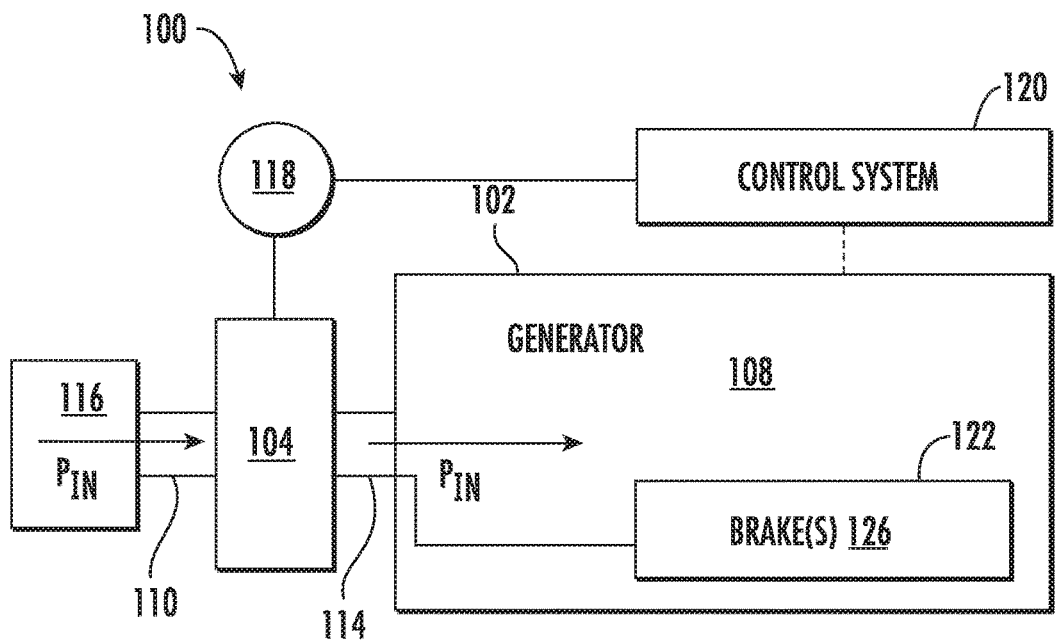
FIGS. 1C and 1D schematically depict exemplary generators with a lubrication monitoring system.
Figure 1D:
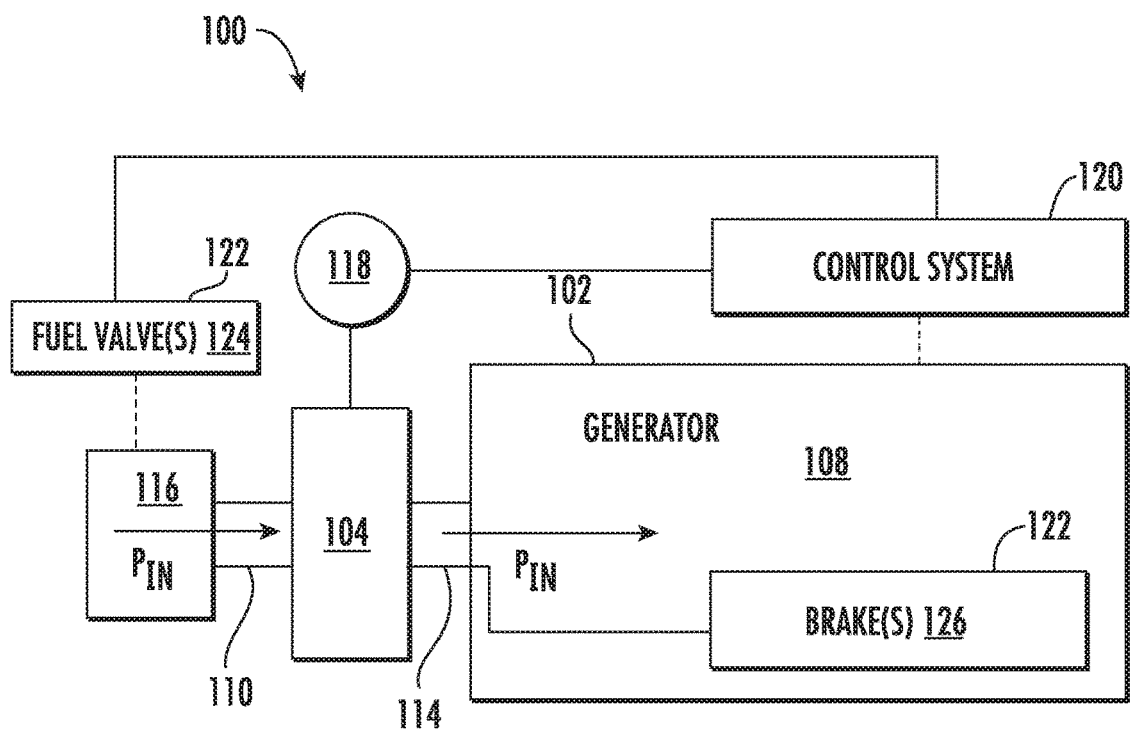

Now referring to the Figures, exemplary embodiments of the present disclosure will now be described in further detail. As shown in FIG. 1A, a lubrication monitoring system 100 may be implemented with any machine 102 that utilizes a gear assembly 104. For example, as shown in FIG. 1B, the machine 102 may include an engine 106 such as a turbomachine engine. An exemplary turbomachine engine 106 includes a turbofan engine utilized to power an aircraft, including a civilian, commercial, or military aircraft. In some embodiments, the gear assembly may be a fan drive gear system for a turbomachine engine 106. As shown in FIG. 1C, the machine 102 may include a generator 108 such as a turbine generator, including a wind turbine generator. As shown in FIG. 1D, the machine 102 may be a fuel-powered generator 108. A fuel-powered generator 108 may utilize any fuel, including liquid fuel such as ethanol, kerosene, gasoline, natural gas, and so forth; or solid fuel such as coal, hog fuel, waste material, and so forth. As further examples, the machine 102 may include an internal combustion engine, an electric powered engine, a steam powered engine, and so forth. The machine 102 may be utilized to power a vehicle, such as an aircraft, a motor vehicle, a marine vessel, and the like. The machine 102 may be utilized in connection with a power generation facility, a manufacturing facility, an industrial machine, and so forth. It will be appreciated that a lubrication monitoring system 100 may also be implemented with any other machine 102, all of which are within the scope of the present disclosure, and the embodiments depicted are provided by way of example and not to be limiting.

As shown in FIGS. 1A and 1B, an exemplary lubrication monitoring system 100 includes a gear assembly 104 coupled to a machine 102 such as via a drive shaft or an input shaft 110. The gear assembly 104 may additionally be coupled to outbound propulsion element 112 via a driven shaft or an output shaft 114. The outbound propulsion element 112 may include a wheel, disk, rotor, fan, impeller, or the like and/or componentry related thereto. The outbound propulsion element 112 may be configured to output power to an outside source via the output shaft 114. Power may be supplied to the outbound propulsion element 112 at least in part by the machine 102, translated through the gear assembly 104 thereto.

As shown in FIGS. 1C and 1D, the machine 102 may include a generator 108, in which case the gear assembly 104 may be coupled to the machine 102 via a driven shaft or an output shaft 114. The gear assembly 104 may additionally be coupled to an inbound propulsion element 116 such as via a drive shaft or an input shaft 110. The inbound propulsion element 116 may include a wheel, disk, rotor, fan, impeller, or the like and/or componentry related thereto. In the embodiments shown in FIGS. 1C and 1D, the inbound propulsion element 116 may be configured to input power from an outside source to the gear assembly 104 via the input shaft 110, and the gear assembly 104 may then translate that power to the generator 108 via the output shaft 114. In some embodiments, an inbound propulsion element 116 may under power from wind, such as in the case of a wind turbine generator 108. In some embodiments, an inbound propulsion element 116 may under power from fuel combustion, such as in the case of a fuel-powered generator 108.

An exemplary lubrication monitoring system 100 may include one or more sensors 118 configured to monitor a condition of the lubricant film and/or a change in a condition of the lubricant film as described herein. The one or more sensors 118 may be configured to obtain a value for one or more electrical properties of a circuit crossing the gear assembly 104 and to output a signal indicative of the value for the electrical property. The signal may be output, for example, to a control system 120. The control system 120 may be configured to receive a signal from the one or more sensors 118 and to ascertain whether the value for the electrical property obtained by the sensor 118 corresponds to a warning level for a condition of the lubricant film and/or a change in a condition of the lubricant film. The control system 120 may be further configured to output one or more control commands when the value for the electrical property corresponds to the warning level for the condition of the lubricant film. The control commands may be configured to perform one or more operations in response to the condition of the lubricant film and/or the change in a condition of the lubricant film. Such operations may include causing a user interface to display an alarm responsive to the warning level and/or causing data responsive to the warning level to be transmitted to a management system. Additionally, or in the alternative, such operations may include controlling a controllable component 122 responsive to the warning level, such as fuel valves 124 (FIGS. 1A, 1B, 1D) and/or brakes 126 (FIG. 1C, 1D). Such a controllable component 122 may be controlled according to such a control command, for example, so as to mitigate or prevent damage to the gear assembly that might otherwise result from the condition of the lubricant film or the change in the condition of the lubricant film. For example, in some embodiments, the control system 120 may close one or more fuel valves 124 so as to shut down a machine 102 in response to the condition of the lubricant film or a change in condition of the lubricant film. In another embodiment, the control system 120 may actuate one or more brakes 126 so as to stop rotation of a generator 108 in response to the condition of the lubricant film or a change in condition of the lubricant film.

Figure 2A:
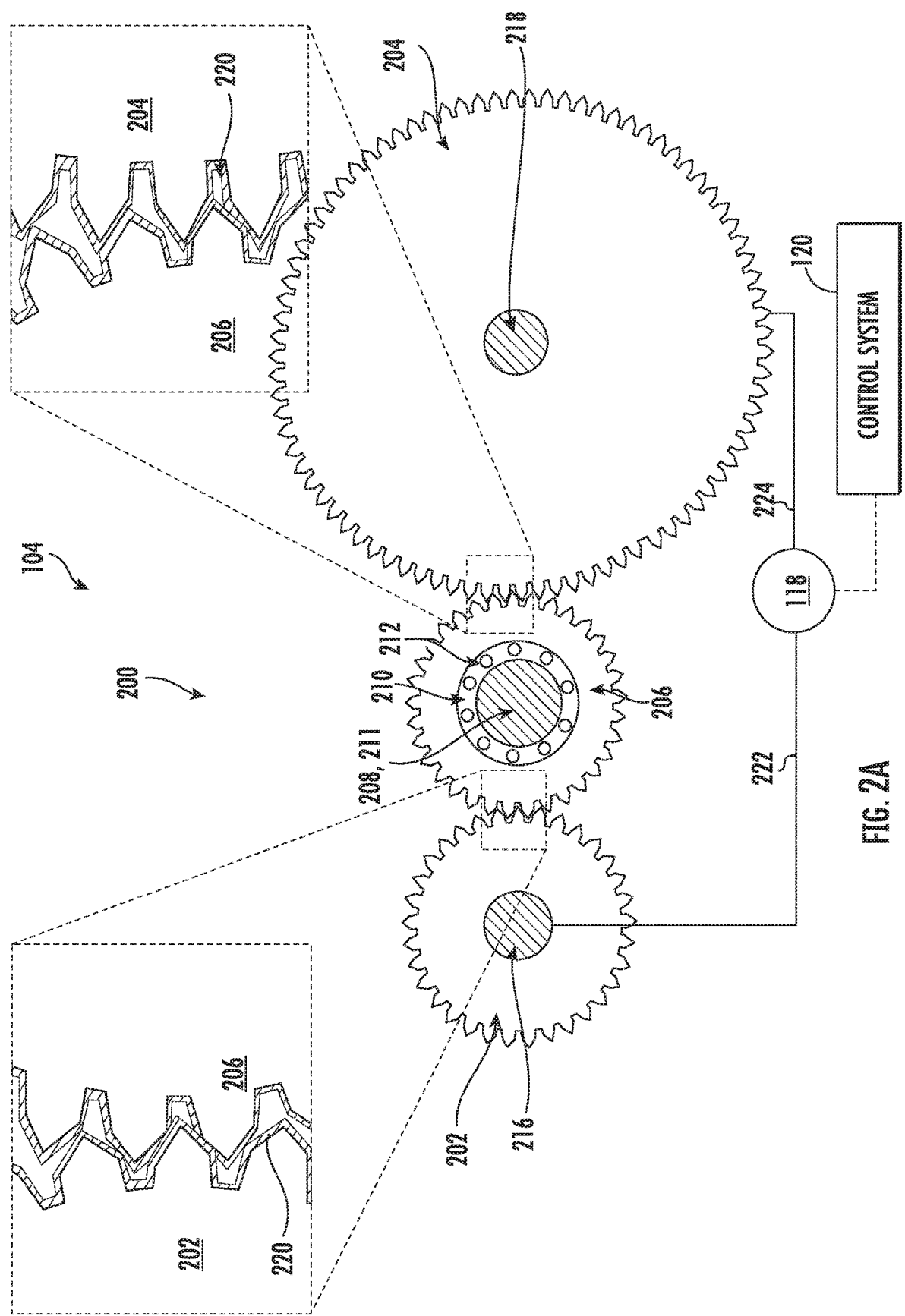
FIG. 2A schematically depicts a perspective view of an exemplary gear assembly that includes a lubrication monitoring system.
Figure 2B:
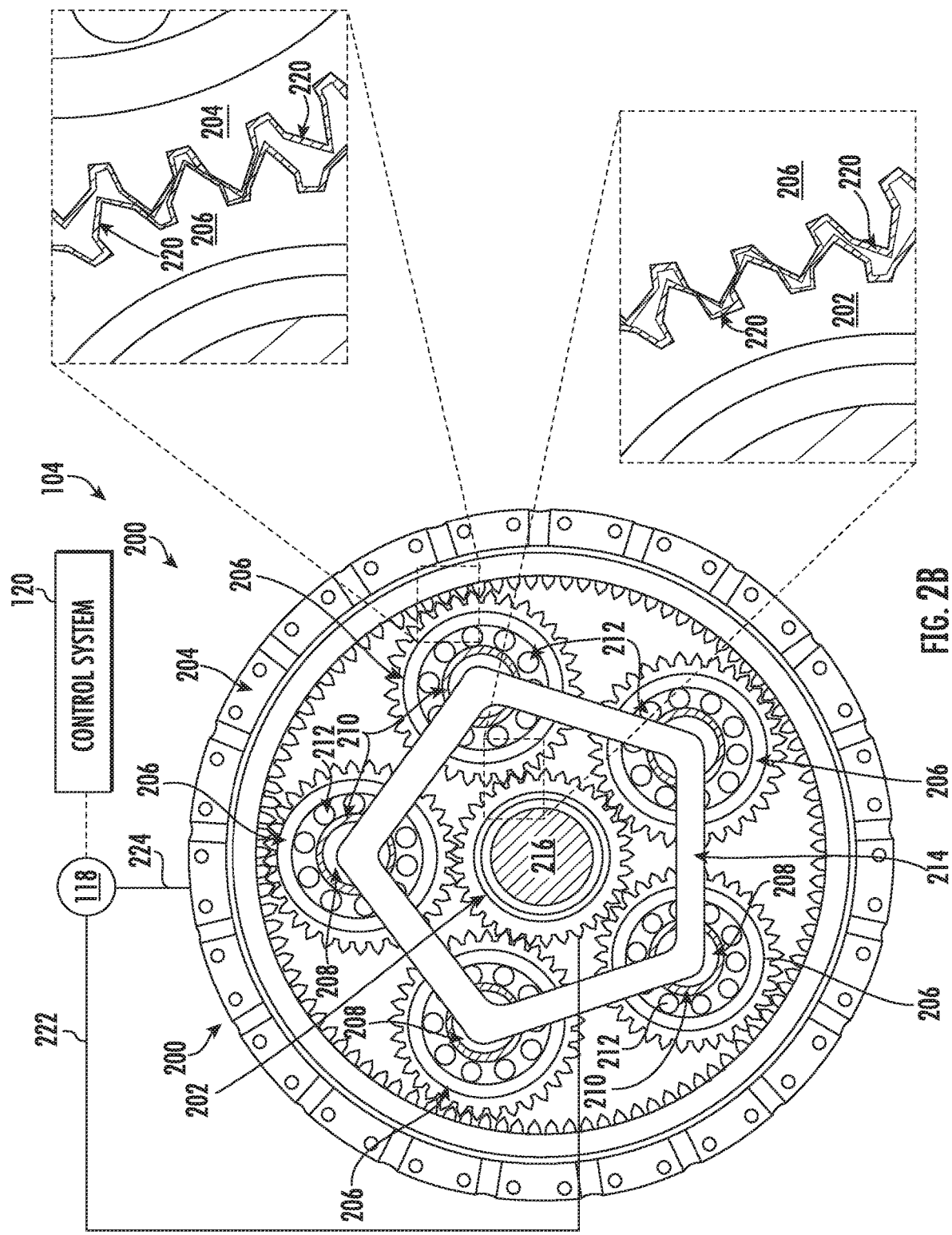
FIG. 2B schematically depicts a perspective view of another exemplary gear assembly that includes a lubrication monitoring system.
Figure 2C:
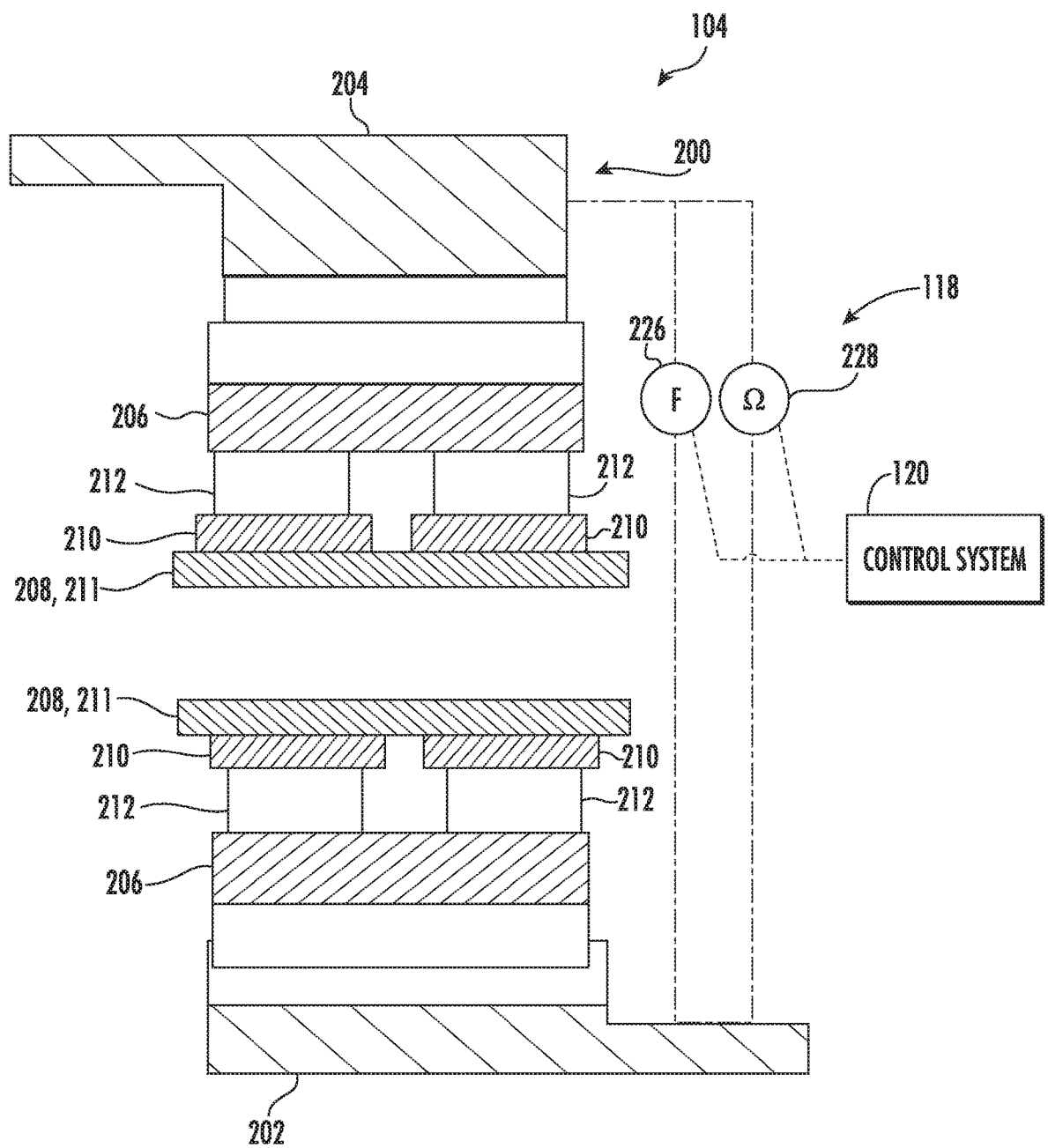
FIG. 2C schematically depicts a cross-sectional view of the gear assembly of FIG. 2B.
Figure 2D:
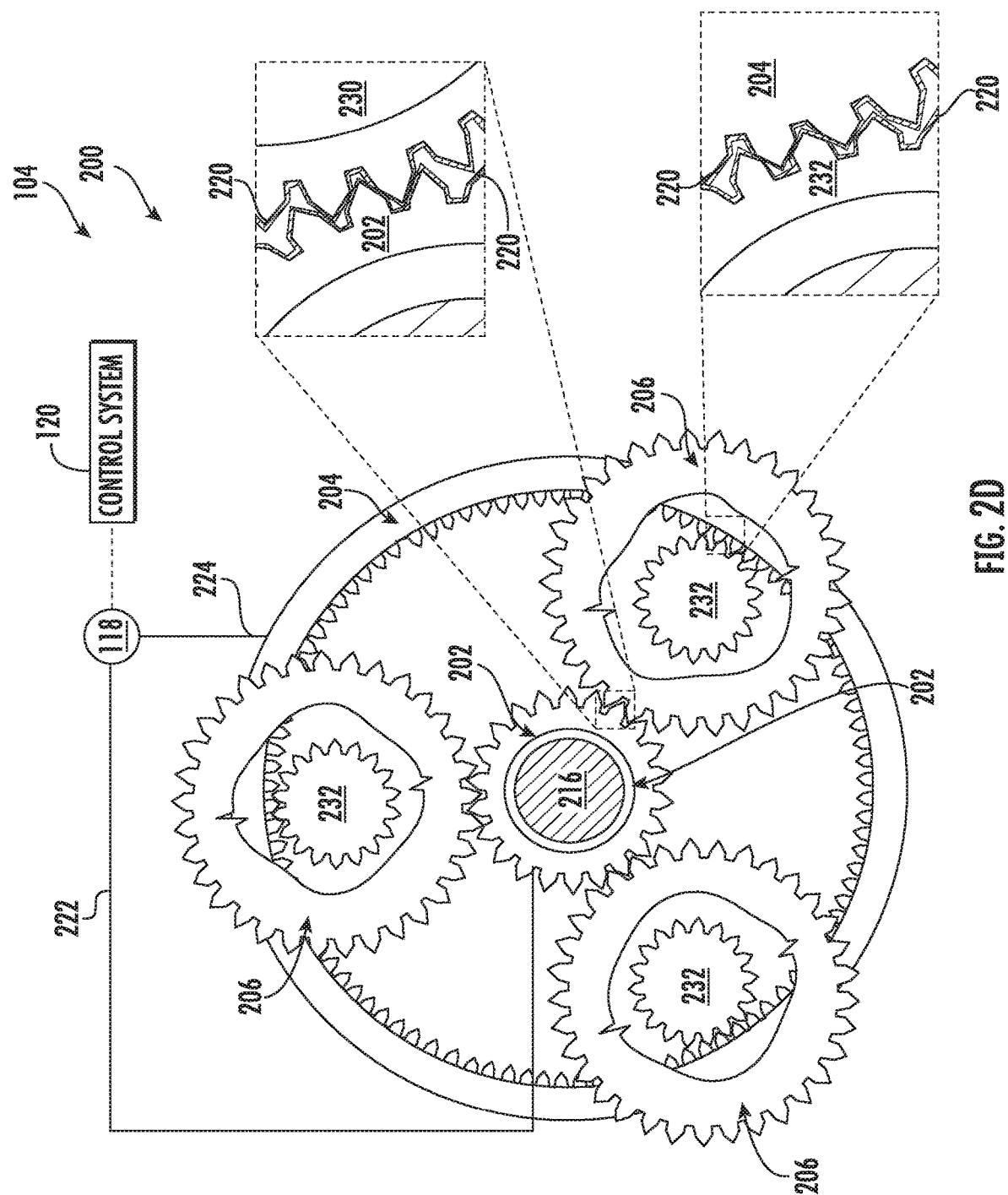
FIG. 2D schematically depicts a perspective view of yet another exemplary gear assembly that includes a lubrication monitoring system.
Figure 2E:
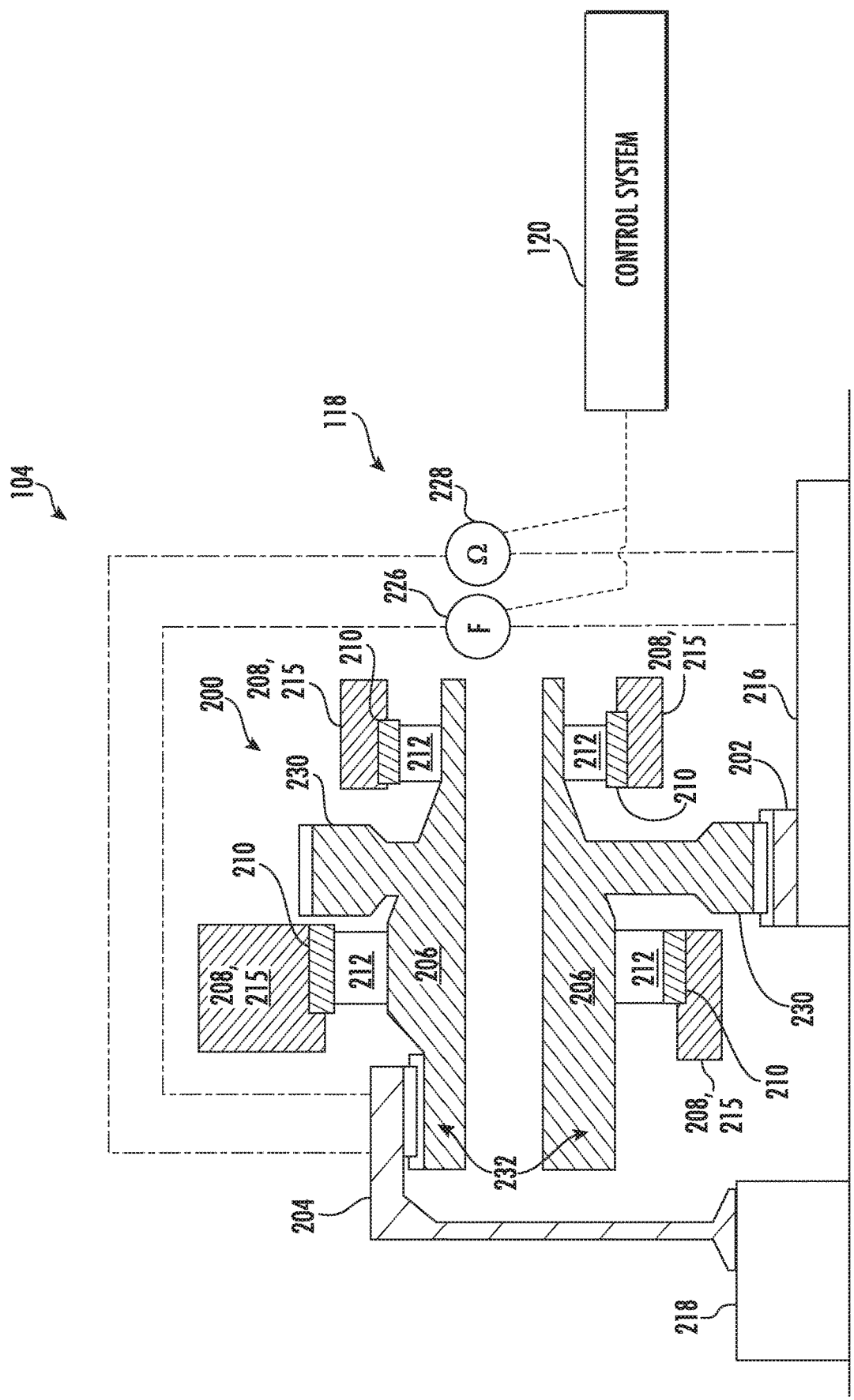
FIG. 2E schematically depicts a cross-sectional view of the gear assembly of FIG. 2D.

Now turning to FIGS. 2A-2E, exemplary gear assemblies 104 of a lubrication monitoring system 100 will be described in further detail. As will be described herein, a gear assembly 104 may include a gear train 200 with at least three gears that mesh with one another. The gear train 200 may be housed in a housing (not shown). During operation a lubricant may be supplied to the gear assembly, forming a lubricant film that separates the gears from one another and thereby protects the gears from wear or damage. FIG. 2A shows an exemplary gear train 200 with a plurality of gears meshing with one another in series. FIG. 2B shows an exemplary gear train 200 with an epicyclical configuration. FIG. 2C shows a cross-sectional view of the exemplary gear train 200 of FIG. 2B. FIG. 2D shows another exemplary gear train 200 with an epicyclical configuration, in which the epicyclical configuration includes exemplary stepped or multi-stage planetary gears. FIG. 2E shows a cross-sectional view of the exemplary gear train 200 of FIG. 2D.

As shown in FIGS. 2A-2E, a gear train 200 has at least three gears including a first gear 202, a second gear 204, and at least one intermediate gear 206 operably meshed with the first gear 202 and the second gear 204. The first gear 202 may mesh with an intermediate gear 206, and the intermediate gear 206 may mesh with the second gear 204. In some embodiments, a plurality of intermediate gears 206 may be provided. The plurality of intermediate gears 206 may each individually mesh with the first gear 202 and the second gear 204. Alternatively, a plurality of intermediate gears 206 may include one or more intermediate gears 206 that are separated from the first gear 202 and/or the second gear 204 by at least one other intermediate gear 206. In some embodiments, the plurality of intermediate gears 206 may be stepped or multi-stage intermediate gears 206.

An intermediate gear 206 may be operably coupled to a support structure 208 by a bearing assembly 210 that includes one or more components formed of an electrical insulator material that electrically insulates the intermediate gear 206 from the support structure 208. As shown in FIGS. 2A, 2B, and 2C, the support structure 208 may include a support pin 211 operably coupling the bearing assembly 210 to framework associated with the gear assembly 104. In some embodiments, the bearing assembly 210 may include rolling elements 212 formed of an electrical insulator material so as to electrically insulate the intermediate gear 206 from the support structure 208. Additionally, or in the alternative, the bearing assembly 210 may include other components formed of an electrical insulator material, such as a race, a guiderail, a roller cage, and so forth. The support pin 211 may be operably coupled to or integrally formed as part of a support structure 208. As shown in FIG. 2B, the support structure 208 may include a carrier 214. As shown in FIG. 2E, the support structure 208 may include framework 215 associated with the gear assembly 104. The electrical insulator material of the rolling elements 212 and/or other components may allow electrical properties to be measured between the first gear 202 and the second gear 204, while avoiding the support structure 208 acting as a ground or otherwise causing interference in such measurements.

As shown in FIG. 2A, an exemplary gear train 200 may include a first gear 202 that operates as an input gear or a drive gear, a second gear 204 that operates as an output gear or a driven gear, and at least one intermediate gear 206 that operates as an idler gear. The input gear may be operably coupled to a first shaft 216, which may be an input shaft or a drive shaft 110 configured to provide power input to the gear assembly. The output gear may be operably coupled to a second shaft 218, which may be an output shaft or driven shaft 114 configured to rotate according to a gear ratio defined by the gear train 200. Alternatively, the configuration shown in FIG. 2A may be reversed, such that the second 204 gear may be an input gear and the first gear 202 may be an output gear. With this alternative, the second gear 204 may be an input gear or a drive gear, and the first gear 202 may be an output gear or a driven gear.

As shown in FIGS. 2B-2E, an exemplary gear train 200 may include an epicyclical configuration that includes a first gear 202 that operates as a sun gear, a second gear 204 that operates as a ring gear, and one or more intermediate gears 206. As shown in FIGS. 2B and 2C, the intermediate gears 206 may be operably coupled to a carrier 214 via a support pin 211 and bearing assembly 210. As shown in FIGS. 2D and 2E, the intermediate gears 206 may be stepped or multi-stage gears operably coupled to framework 215 via a bearing assembly 210. The intermediate gears 206 may operate as planetary gears, with either a planetary, star, or solar epicyclical configuration. An epicyclical gear train 200 may include a first shaft 216, and a second shaft 218. The first shaft 216 may be an input shaft or drive shaft 110, and the second shaft 218 may be an output shaft or driven shaft 114. Alternatively, the first shaft 216 may be an output shaft or driven shaft 114, and the second shaft 218 may be an input shaft or drive shaft 110. The first shaft 216 and the second shaft 218 may rotate relative to one another according to a gear ratio defined by the gear train 200.

With a planetary epicyclical configuration, for example, as shown in FIG. 2B, the carrier 214 and the first gear 202 (i.e., the sun gear) may rotate relative to one another, with the first shaft 216 coupled to the first gear 202 (i.e., the sun gear) and the second shaft 218 coupled to the carrier 214 (coupling not shown in FIG. 2B). In such a planetary epicyclical configuration, the intermediate gears 206 rotate about their axis while traveling around the first gear 202 (i.e., the sun gear) while the second gear 204 (i.e., the ring gear) remains fixed and non-rotating.

Alternatively, with a star epicyclical configuration, for example, as shown in FIGS. 2D and 2E, the intermediate gears 206 may rotate about their axis at a fixed location while the first gear 202 (i.e., the sun gear) and the second gear 204 (i.e., the ring gear) both rotate about their axis. In such a star epicyclical configuration, the first shaft 216 may be coupled to the first gear 202 (i.e., the sun gear) and the second shaft 218 may be coupled to the second gear 204 (i.e., the ring gear). Though not shown in FIGS. 2D and 2E, a fixed and non-rotating carrier 214 may also be provided in such a star epicyclical configuration.

Further in the alternative, with a solar epicyclical configuration, the carrier 214 and the second gear 204 (i.e., the ring gear) rotate relative to one another while the first gear 202 (i.e., the sun gear) remains fixed and non-rotating. In such a solar epicyclical configuration, the first shaft 216 may be coupled to the carrier 214 and the second shaft 218 may be coupled to the second gear 204 (i.e., the ring gear), while the intermediate gears 206 rotate about their axis and travel around the first gear 202 (i.e., the sun gear).

The exemplary gear assemblies 104 shown in FIGS. 2A-2E are provided by way of example only and not to be limiting. It will be appreciated that a gear assembly 104 and/or a gear train 200 may be configured in numerous other ways that include a first gear 202, a second gear 204, and at least one intermediate gear 206 operably meshed with the first gear 202 and the second gear 204, all of which are within the scope of the present disclosure. By way of example, a gear assembly 104 may include an epicyclical gear assembly 104, a strain wave gear assembly 104, or a double reduction gear assembly 104, as well as any other gear assembly 104 and combinations of the foregoing. Exemplary gears include spur gears, helical gears, herringbone gears, spiral gears, hypoid gears, crown gears, worm gears, and so forth, any of which or combination thereof may be included in an exemplary gear assembly 104 and/or gear train 200.

During operation, the gear assembly 104 typically requires a lubricant to protect the gear train 200 from wear such as between meshing gears. Lubricant may be supplied to the gear train 200, for example from a lubricant manifold in fluid communication with supply tubes or the like (not shown). As shown in the enlarged views of FIGS. 2A, 2B, and 2D, the lubricant typically forms a lubricant film 220 between meshing gears. The lubricant film 220 may separate the meshing gears thereby mitigating or preventing wear. A sensor 118 may be configured to monitor a condition of the lubricant film 220 and/or a change in a condition of the lubricant film 220 as described herein. The sensor 118 may be operably configured to obtain a value for an electrical property of a circuit crossing the gear assembly 104 and to output a signal indicative of the value for the electrical property obtained by the sensor 118.

A first electrical lead 222 may electrically couple the sensor 118 to the first gear 202 or another component uninsulated from the first gear 202, such as the first shaft 216 so as to form a first electrical connection. A second electrical lead 224 may electrically couple the sensor 118 to the second gear 204 or another component uninsulated from the second gear, such as the second shaft 218. For example, the sensor 118 may be electrically coupled to the first gear 202 and the second gear 204. Alternatively, the sensor 118 may be electrically coupled to the first shaft 216 when the first gear 202 and the first shaft 216 are operably coupled to one another, and/or the sensor 118 may be electrically coupled to the second shaft 218 when the second gear 204 and the second shaft 218 are operably coupled to one another.

The sensor 118 may be configured to measure any one or more electrical properties, including capacitance, impedance, inductance, resistance, reactance, capacitive reactance, and/or inductive reactance. The sensors 118 may be configured to send a signal to a control system 120. The control system 120 may process the signal in order to monitor a condition of the lubricant film 220 based at least in part on an electrical property, which may include monitoring for adequate thickness of the lubricant film 220, monitoring for interruptions or discontinuities in the lubricant film 220, monitoring for the presence of contaminants in the lubricant, and/or monitoring for a level of breakdown of the lubricant. Additionally, or in the alternative, the control system 120 may process the signal in order to monitor a change in the condition of the lubricant film 220 based at least in part on a change in an electrical property, which may include monitoring for a change in the thickness of the lubricant film 220, monitoring for a change in interruptions or discontinuities in the lubricant film 220, monitoring for a change in the presence of contaminants in the lubricant, and/or monitoring for a change in the level of breakdown of the lubricant.

In some embodiments, a plurality of sensors 118 may be utilized. For example, as shown in FIGS. 2C and 2E, a plurality of sensors 118 may include a first sensor 226 configured to measure a first electrical property, and a second sensor 228 configured to measure a second electrical property. The first and second electrical properties may be any two electrical properties. As shown, the first electrical property may be capacitance and the second electrical property may be resistance. In some embodiments, the control system 120 may ascertain a condition of the lubricant film 220 and/or a change in a condition of the lubricant film 220 based at least in part on a relationship between two or more electrical properties. In some embodiments, the control system 120 may ascertain a first condition of the lubricant film 220 and/or a change in a first condition of the lubricant film 220 based at least in part on a signal from a first sensor 226; and the control system 120 may ascertain a second condition of the lubricant film 220 and/or a change in a second condition of the lubricant film 220 based at least in part on a signal from a second sensor 228. By way of example, the first condition may include the thickness of the lubricant film 220 or a change in the thickness of the lubricant film, and the second condition may include the presence of contaminants in the lubricant or a change in the presence of contaminants in the lubricant.

Figure 3A:
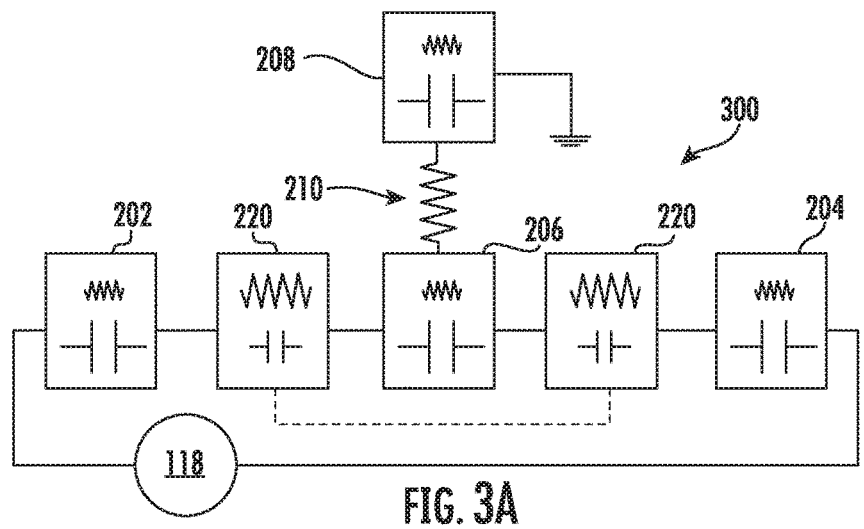
FIGS. 3A-3C schematically depict exemplary circuits for monitoring lubrication of a gear assembly.
Figure 3B:
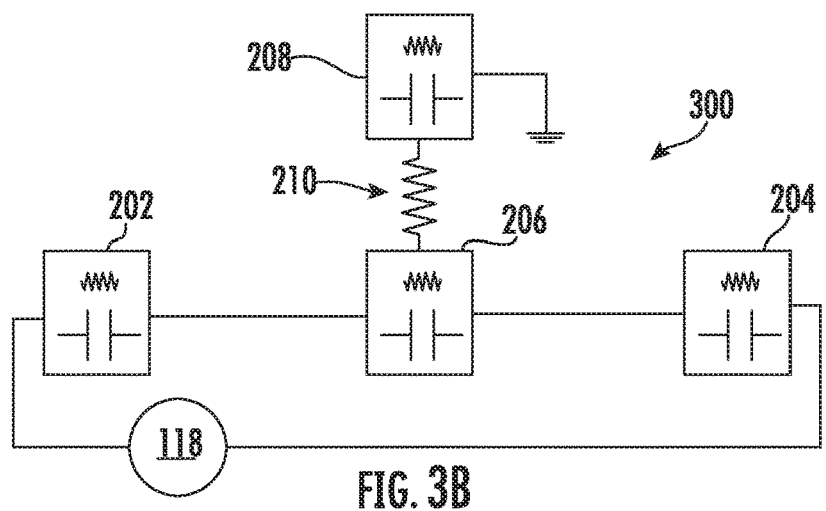
Figure 3C:
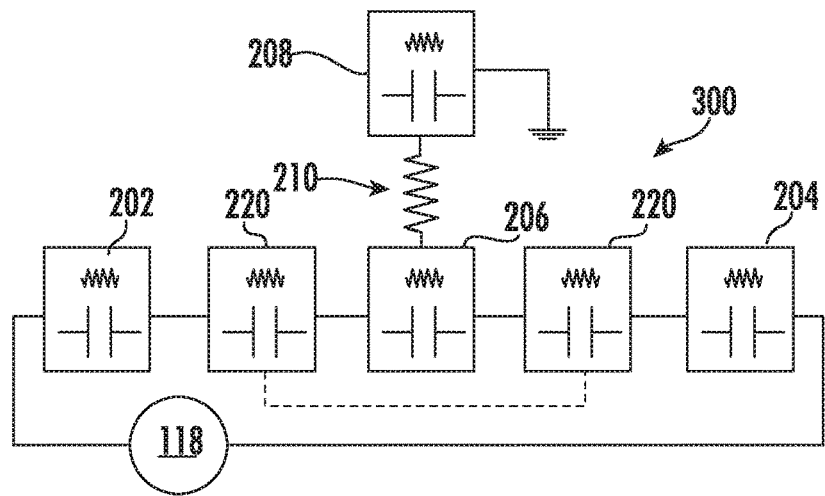

As shown in FIGS. 3A-3C, a circuit 300 for monitoring lubrication of a gear assembly 104 includes a first gear 202, an intermediate gear 206, and a second gear 204. As shown in FIG. 3A, the circuit 300 additionally includes a lubricant film 220 separating the intermediate gear 206 from the first gear 202 and the second gear 204. A sensor 118 may be operably configured to measure one or more electrical properties of the circuit 300. The first gear 202, the intermediate gear 206, and the second gear 204 are conductors, and exhibit a relatively lower resistivity and a relatively greater conductivity. The lubricating film, on the other hand, exhibits a relatively greater resistivity and a relatively lower conductivity. A current may flow across the circuit 300 and may be detectable by the sensor 118, such that the sensor 118 may measure one or more electrical properties of the circuit. A bearing assembly 210 coupling the intermediate gear 206 to a support structure 208 may be formed of an electrically insulating material so as to insulate the intermediate gear 206 from the support structure 208, which may otherwise ground the circuit 300. During normal operation of a gear assembly 104, current flows across the circuit 300 from the first gear 202 to the intermediate gear 206, crossing the lubricating film 220 between the first gear 202 and the intermediate gear 206, then from the intermediate gear 206 to the second gear 204, crossing the lubricating film 220 between the intermediate gear 206 and the second gear 204. Alternatively, the current may flow in the opposite direction. A portion of the current may also flow through the lubricating film 220, at least partially bypassing the intermediate gear 206. Such a circuit 300 may exhibit one or more electrical properties characteristic of the configuration of the circuit 300 that may be measured by the sensor 118 and identifiable by the control system 120 as a first set of one or more electrical properties. The first set of electrical properties may include a value and/or a range for one or more of: capacitance, impedance, inductance, resistance, reactance (e.g., capacitive reactance, and/or inductive reactance).

As shown in FIG. 3B, under some conditions, the lubricant film 220 may become interrupted such that the intermediate gear 206 may come into contact with the first gear 202 and/or the second gear 204 at such an interruption in the lubricant film 220. An interruption in the lubricant film 220 may arise, for example, from a shortage of lubrication or an interruption in lubrication flow, and/or improper operation of the gear assembly causing gears to gnash with one another. With the lubricant film 220 interrupted, current may flow across a circuit 300 including the first gear 202, the intermediate gear 206, and the second gear 204, without needing to cross the lubricating film 220 between the first gear 202 and the intermediate gear 206 and/or without needing to cross the lubricant film 220 between the intermediate gear 206 and the second gear 204. The circuit 300 shown in FIG. 3B may at least partially bypass the lubricant film 220 when the intermediate gear 206 contacts the first gear 202 and/or the second gear 204 at an interruption in the lubricant film 220. Such a circuit 300 corresponding to an interruption in the lubricant film 220 may exhibit one or more electrical properties characteristic of the configuration of the circuit 300 that may be measured by the sensor 118 and identifiable by the control system 120 as a second set of one or more electrical properties. The second set of electrical properties may differ from the first set of electrical properties. For example, the second set of electrical properties may exhibit a relatively greater capacitance, a relatively lower impedance, a relatively greater inductance, a relatively lower resistance, and/or a relatively lower reactance (e.g., capacitive reactance, and/or inductive reactance), as compared to the first set of electrical properties.

In addition, or in the alternative to the circuit 300 configuration shown in FIG. 3B, under some conditions, the electrical properties of the lubricant film 220 may change, as shown in FIG. 3C. Such a change in the electrical properties of the lubricant film 220 correlate to a condition of the lubricant film 220. For example, the thickness of the lubricant film 220 may change, or a level of contaminants in the lubricant film 220 may change. A circuit 300 associates with such changes in electrical properties may follow the same or similar path as shown in FIG. 3A, except that one or more electrical properties characteristic of the configuration of the circuit 300 may differ. Such electrical properties may be measured by the sensor 118 and identifiable by the control system 120 as a third set of one or more electrical properties. The third set of electrical properties may differ from the first set of electrical properties. For example, a narrower lubricant film 220 and/or a presence of contaminants in the lubricant film 220 such as metal particles may provide a third set of electrical properties that exhibit a relatively greater capacitance, a relatively lower impedance, a relatively greater inductance, a relatively lower resistance, and/or a relatively lower reactance (e.g., capacitive reactance, and/or inductive reactance), as compared to the first set of electrical properties. Of course, it will be appreciated that the nature of the electrical properties corresponding to a presence of contaminants in the lubricant film 220 may differ depending on the nature of the contaminants.

A reference value for one or more electrical properties may be defined, including, for example, a reference value for impedance, a reference value for inductance, a reference value for resistance, a reference value for reactance (e.g., capacitive reactance, and/or inductive reactance). Additionally, or in the alternative, a warning level for a condition of the lubricant film 220 may be defined, including, for example, a warning level for a thickness of the lubricant film 220, a warning level for an interruption in the lubricant film 220, and or a warning level for a presence of contaminants in the lubricant film 220.

A control system 120 may be configured to ascertain whether a value for an electrical property corresponds to a warning level for a condition of the lubricant film 220, and to output a control command when the value for the electrical property corresponds to the warning level for the condition of the lubricant film 220. For example, in some embodiments, the one or more electrical properties measured by a sensor 118 may include impedance. The control system 120 may ascertain a value for impedance based at least in part on a signal from the sensor 118 and compare the value for impedance to a reference value for impedance. The control system 120 may further ascertain whether the value for impedance corresponds to a warning level for a condition of the lubricant film 220 based at least in part on the comparison of the value to the reference. For example, the control system 120 may ascertain that the value for impedance corresponds to a warning level for a condition of the lubricant film 220 when the value for impedance is less than or equal to the reference value for impedance.

As a further example, in some embodiments, the one or more electrical properties measured by a sensor 118 may additionally or alternatively include capacitance. The control system 120 may ascertain a value for capacitance based at least in part on a signal from the sensor 118 and compare the value for capacitance to a reference value for capacitance. The control system 120 may further ascertain whether the value for capacitance corresponds to a warning level for a condition of the lubricant film 220 based at least in part on the comparison of the value to the reference. For example, the control system 120 may ascertain that the value for capacitance corresponds to a warning level for a condition of the lubricant film 220 when the value for capacitance is less than or equal to the reference value for impedance.

In still further embodiments, the control system 120 may ascertain whether a combination of values for one or more of electrical properties corresponds to a warning level for a condition of the lubricant film 220. For example, the control system 120 may ascertain that a combination of values for one or more of electrical properties corresponds to a warning level for a condition of the lubricant film 220 when the combination of values correspond to a combination of reference values.

Figure 4:
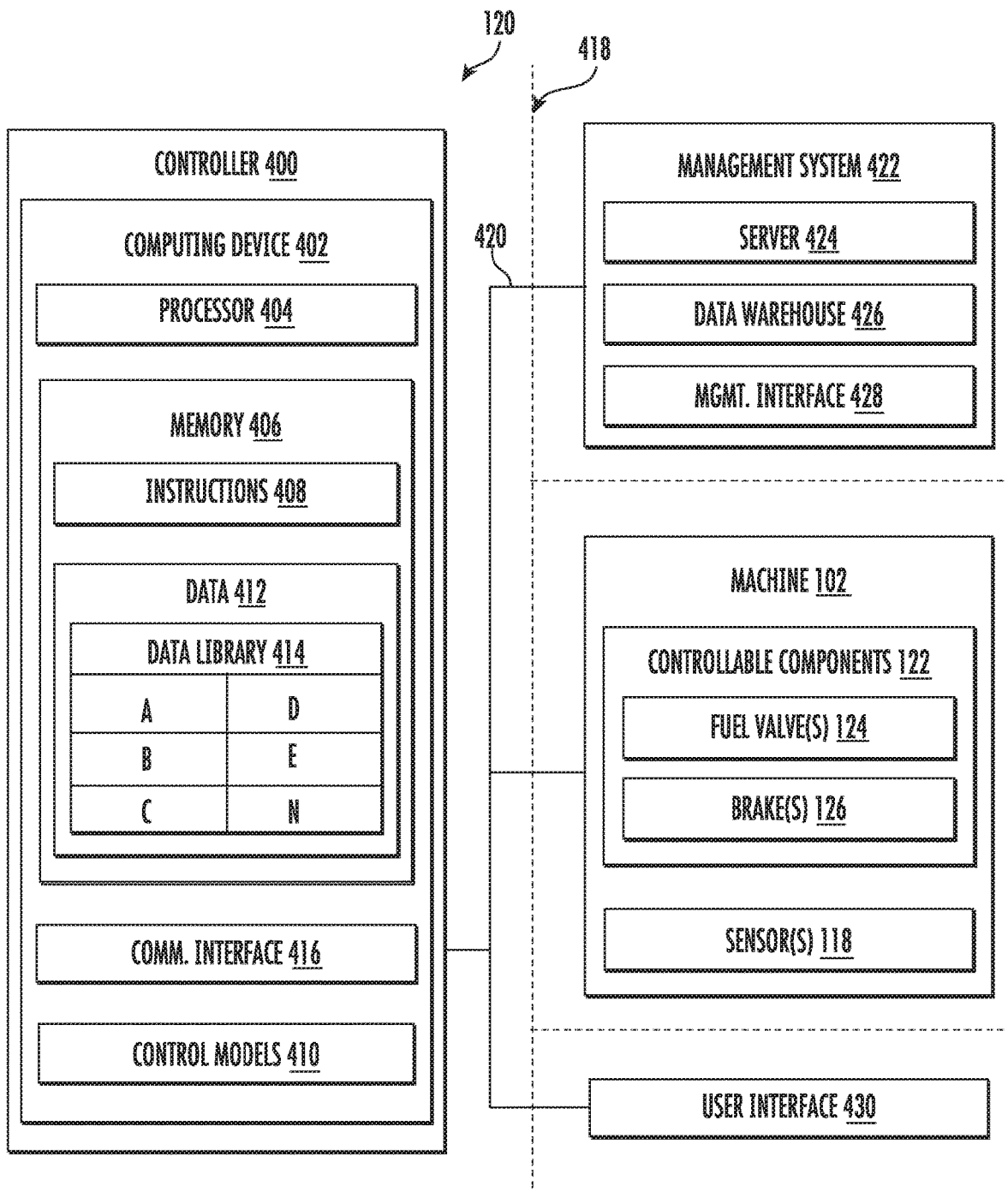
FIG. 4 schematically depicts an exemplary control system for use with a lubrication monitoring system.

Now referring to FIG. 4, an exemplary control system 120 for monitoring lubrication of a gear assembly 104 will be described. An exemplary control system 120 includes a controller 400 configured to receive a signal from one or more sensors 118, which may provide inputs corresponding to one or more electrical properties that may be used by the controller 400 to ascertain a condition of the lubricant film 220. The controller 400 may include one or more computing devices 402, which may be located locally or remotely relative to the gear assembly 104 or machinery to which the gear assembly 104 may be coupled. For example, the controller may be located locally or remotely relative to a machine 102 or generator 108. The one or more computing devices 402 may include one or more processors 404 and one or more memory devices 406. The one or more processors 404 may include any suitable processing device, such as a microprocessor, microcontroller, integrated circuit, logic device, and/or other suitable processing device. The one or more memory devices 406 may include one or more computer-readable media, including but not limited to non-transitory computer-readable media, RAM, ROM, hard drives, flash drives, and/or other memory devices 406.

The one or more memory devices 406 may store information accessible by the one or more processors 404, including machine-executable instructions 408 that can be executed by the one or more processors 404. The instructions 408 may be any set of instructions which when executed by the one or more processors 404 cause the one or more processors 404 to perform operations. In some embodiments, the instructions 408 may be configured to cause the one or more processors 404 to perform operations for which the controller 400 and/or the one or more computing devices 402 are configured. Such operations may include controlling one or more controllable components 122, including, for example, one or more fuel valves 124 and/or one or more brakes 126. Such operations may additionally or alternatively include receiving inputs from one or more sensors 118, and controlling the one or more controllable components 122 based at least in part on the inputs from the one or more sensors 118. Such operations may be carried out according to control commands provided by a control model 410. As an example, the control model 410 may include correlations between one or more electrical properties and one or more conditions of a lubricant film 220. Additionally, or in the alternative, a control model 410 may include reference values and/or warning levels for one or more electrical properties, and one or more control commands associated therewith. The machine-executable instructions 408 can be software written in any suitable programming language or can be implemented in hardware. Additionally, and/or alternatively, the instructions 408 can be executed in logically and/or virtually separate threads on processors 404.

The memory devices 406 may store data 412 accessible by the one or more processors 404. The data 412 can include current or real-time data, past data, or a combination thereof. The data 412 may be stored in a data library 414. As examples, the data 412 may include data associated with or generated by lubrication monitoring system 100, including data 412 associated with or generated by a controller 400, one or more controllable components 122, one or more sensors 118, and/or a computing device 402. The data 412 may also include other data sets, parameters, outputs, information, associated with a lubrication monitoring system 100, such as those associated with one or more electrical properties of a circuit 30 crossing a gear assembly 104 and/or those associated with one or more conditions of a lubricant film 220.

The one or more computing devices 402 may also include a communication interface 416, which may be used for communications with a communications network 418 via wired or wireless communication lines 420. The communications network 418 may include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the controller 400 across the communication lines 420. The communication interface 416 may allow the computing device 402 to communicate with one or more sensors 118 and/or with one or more controllable components 122 of a control system 120. The communication interface 416 may additionally allow the computing device 402 to communicate with a machine 102 and or components associate therewith, such as the controllable components 122.

The communication interface 416 may additionally or alternatively allow the computing device 402 to communicate with a management system 422, which may include a server 424 and/or a data warehouse 426. As an example, at least a portion of the data 412 may be stored in the data warehouse 426, and the server 424 may be configured to transmit data 412 from the data warehouse 426 to the computing device 402, and/or to receive data 412 from the computing device 402 and to store the received data 412 in the data warehouse 426 for further purposes. The server 424 and/or the data warehouse 426 may be implemented as part of a control system 120. The management system may additionally include a management interface 428 operable for displaying data 412. Further, the communication interface 416 may additionally or alternatively allow the computing device 402 to communicate with a user interface 430. The communication interface 416 may include any suitable components for interfacing with one or more network(s), including for example, transmitters, receivers, ports, controllers, antennas, and/or other suitable components. The communication lines 420 of communications network 418 may include a data bus or a combination of wired and/or wireless communication links.

In some embodiments, the control system 120 may be configured to output a control command configured to cause a user interface 430 to display data 412 associated with the lubrication monitoring system 100. For example, the control command may cause the user interface 430 to display an alarm, such as responsive to a warning level. Additionally, or in the alternative, the user interface 430 may display one or more values for one or more electrical properties correlating to a condition of the lubricant film 220.

In some embodiments, the control system 120 may be configured to output a control command configured to cause the communication interface 416 to transmit data 412 to the management interface 428 associated with the lubrication monitoring system 100. For example, a maintenance request may be transmitted to the management system 422. Additionally, or in the alternative, the management interface 428 may display an alarm, such as responsive to a warning level. The management interface 428 may additionally or alternatively display one or more values for one or more electrical properties correlating to a condition of the lubricant film 220.

Figure 5:
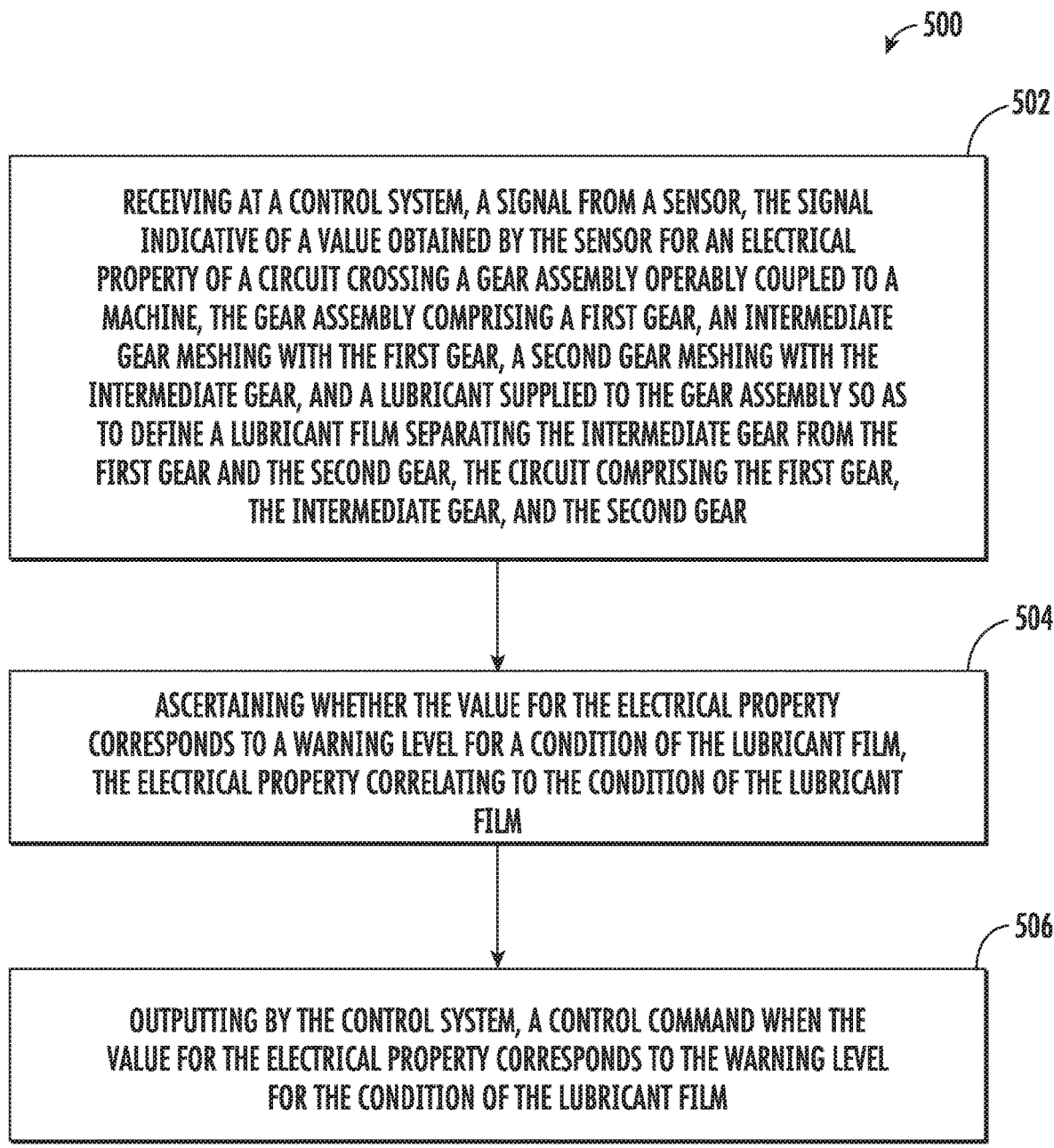
FIG. 5 shows a flowchart depicting an exemplary method of monitoring lubrication of a gear assembly.

Now turning to FIG. 5, exemplary methods of monitoring lubrication of a gear assembly 104 will be discussed. An exemplary method 500 includes, at step 502, receiving at a control system 120 a signal from a sensor 118 indicative of a value obtained by the sensor 118 for an electrical property of a circuit 300 crossing a gear assembly 104 operably coupled to a machine 102. The gear assembly 104 may include a first gear 202, an intermediate gear 206 meshing with the first gear 202, a second gear 204 meshing with the intermediate gear 206, and a lubricant supplied to the gear assembly 104 so as to define a lubricant film 220 separating the intermediate gear 206 from the first gear 202 and the second gear 204. The circuit 300 may include the first gear 202, the intermediate gear 206, and the second gear 204. During normal operation of the gear assembly 104, the lubricant film 220 separates the intermediate gear 206 from the first gear 202 and the second gear 204. Accordingly, the circuit 300 normally includes the lubricant film 220 separating the intermediate gear 206 from the first gear 202 and the second gear 204. However, sometimes the thickness of the lubricant film 220 may be inadequate due to local or generalized pressure, temperature, viscosity conditions, or there may become interruptions in the lubricant film 220 that may allow the intermediate gear 206 to contact the first gear 202 and/or the second gear 204. The circuit 300 may at least partially bypass the lubricant film 220 when an interruption in the lubricant film 220 allows the intermediate gear 206 to contact the first gear 202 and/or the second gear 204. Such an interruption in the lubricant film 220 may define a circuit 300 that includes the intermediate gear 206 contacting the first gear 202 and/or the second gear 204.

An exemplary method 500 may additionally include, at step 504, ascertaining whether the value for the electrical property corresponds to a warning level for a condition of a lubricant film 220, in which the condition of the lubricant film 220 correlates to the electrical property. The condition of the lubricant film 220 may include one or more of a thickness of the lubricant film 220, an interruption in the lubricant film 220, and a presence of contaminants in the lubricant film 220.

An exemplary method 500 may additionally include, at step 506, outputting by a control system 120, a control command when the value for the electrical property corresponds to the warning level for the condition of the lubricant film 220. The control command may be configured to cause a user interface to display an alarm responsive to the warning level. Additionally, or in the alternative, a control command may be configured to cause data responsive to the warning level to be transmitted to a management system. Further in addition, or in the alternative, a control command may be configured to control a controllable component 122 responsive to the warning level.

In some embodiments, the exemplary method 500 may be performed while a gear assembly 104 is in operation, such as when the gear assembly 104 may be coupled to an operational machine 102. For example, the method may be performed with a gear assembly 104 coupled to a turbomachine 106 while the turbomachine is operating. The turbomachine 106 may be utilized to power an aircraft, and the method may be performed while such an aircraft is in flight or while the aircraft is performing ground maneuvers. Additionally, or in the alternative, the exemplary method 500 may be performed as part of a maintenance or service routine for a gear assembly 104 or machine 102 coupled to the gear assembly 104. For example, the method 500 may be performed to confirm that the gear assembly 104 is operating properly after having received maintenance or service.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of monitoring lubrication of a gear assembly during operation of a machine, the method comprising:
   receiving at a control system, a signal from a sensor, the signal indicative of a value obtained by the sensor for an electrical property of a circuit crossing a gear assembly operably coupled to a machine, the gear assembly comprising a first gear, an intermediate gear meshing with the first gear, a second gear meshing with the intermediate gear, and a lubricant supplied to the gear assembly so as to define a lubricant film separating the intermediate gear from the first gear and the second gear, the circuit crossing the first gear, the intermediate gear, and the second gear, so that the first gear, the intermediate gear, and the second gear are part of the circuit;
   ascertaining, by the control system in communication with the sensor, whether the value for the electrical property corresponds to a warning level for a condition of the lubricant film, the electrical property correlating to the condition of the lubricant film; and
   outputting by the control system, a control command when the value for the electrical property corresponds to the warning level for the condition of the lubricant film.

2. The method of claim 1, wherein the circuit additionally crosses the lubricant film separating the intermediate gear from the first gear and the second gear, and wherein at least a portion of a current in the circuit bypasses the lubricant film when the intermediate gear contacts the first gear and/or the second gear at an interruption in the lubricant film.

3. The method of claim 1, further comprising operably coupling the intermediate gear to a support structure by a bearing assembly, the bearing assembly comprising one or more components formed of an electrical insulator material, the bearing assembly electrically insulating the intermediate gear from the support structure.

4. The method of claim 3, wherein operably coupling the intermediate gear to the support structure by the bearing assembly comprises operably coupling the intermediate gear to the support structure by the bearing assembly having the one or more components formed of an electrical insulator material.

5. The method of claim 4, wherein the electrical insulator material comprises a ceramic material.

6. The method of claim 5, wherein the ceramic material comprises one or more of silicon nitride, zirconium dioxide, aluminum oxide, and sialon.

7. The method of claim 1, further comprising arranging the first gear, the intermediate gear, and the second gear in series, and operating the first gear as an input gear, the intermediate gear as an idler gear, and the second gear as an output gear.

8. The method of claim 1, further comprising arranging the first gear, the intermediate gear, and the second gear in an epicyclical configuration, and operating the first gear as a sun gear, the second gear operable as a ring gear, and the intermediate gear as a planetary gear, a solar gear, or a star gear.

9. The method of claim 1, wherein the condition of the lubricant film comprises one or more of a thickness of the lubricant film, an interruption in the lubricant film, and a presence of contaminants in the lubricant film.

10. The method of claim 1, wherein outputting by the control system the control command comprises causing a user interface to display an alarm responsive to the warning level; and/or
causing data responsive to the warning level to be transmitted to a management system; and/or
controlling a controllable component responsive to the warning level.

11. The method of claim 10, wherein controlling the controllable component comprises controlling a fuel valve configured to supply fuel to an engine operably coupled to the gear assembly, and closing the fuel valve responsive to the warning level; and/or
stopping, using a brake, a rotation of a shaft operably coupled to the gear assembly, and actuating the brake responsive to the warning level.

12. The method of claim 1, wherein:
the electrical property comprises impedance, and further comprising ascertaining a value for impedance based at least in part on the signal, comparing the value for impedance to a reference value for impedance, and ascertaining that the value for impedance corresponds to a warning level for a condition of the lubricant film when the value for impedance is less than or equal to the reference value for impedance; and/or
the electrical property comprises capacitance, and further comprising ascertaining a value for capacitance based at least in part on the signal, comparing the value for capacitance to a reference value for capacitance, and ascertaining that the value for capacitance corresponds to a warning level for a condition of the lubricant film when the value for capacitance is greater than or equal to the reference value for capacitance.

13. The method of claim 12, wherein the condition of the lubricant film comprises one or more of a thickness of the lubricant film, an interruption in the lubricant film, and a presence of contaminants in the lubricant film; and wherein the impedance, the capacitance, and/or a combination of impedance and capacitance correlates to the thickness of the lubricant film, the interruption in the lubricant film, and the presence of contaminants in of the lubricant film.

14. A system for monitoring lubrication of a gear assembly during operation of a machine, the system comprising:
a machine;
a gear assembly coupled to the machine via an input shaft, the gear assembly comprising a first gear, an intermediate gear meshing with the first gear, a second gear meshing with the intermediate gear, and a lubricant supplied to the gear assembly so as to define a lubricant film separating the intermediate gear from the first gear and the second gear;
a sensor operably configured to obtain a value for an electrical property of a circuit crossing the gear assembly and to output a signal indicative of the value for the electrical property obtained by the sensor, the circuit crossing the first gear, the intermediate gear, and the second gear, so that the first gear, the intermediate gear, and the second gear are part of the circuit; and
a control system operably configured to receive the signal from the sensor, to ascertain whether the value for the electrical property corresponds to a warning level for a condition of the lubricant film and to output a control command when the value for the electrical property corresponds to the warning level for the condition of the lubricant film, the electrical property correlating to the condition of the lubricant film.

15. The system of claim 14, wherein the gear assembly comprises an additional intermediate gear meshing with the first gear, the second gear additionally meshing with the additional intermediate gear, and the lubricant film separating the additional intermediate gear from the first gear and the second gear.

16. The system of claim 14, further comprising:
a controllable component associated with the machine, the controllable component comprising a fuel valve, the control command configured to control the controllable component responsive to the warning level.

17. The system of claim 14, wherein the machine comprises a turbomachine engine.

18. The system of claim 14, wherein the gear assembly comprises the intermediate gear operably coupled to a support structure by a bearing assembly, the bearing assembly comprising rolling elements formed of an electrical insulator material, the rolling elements electrically insulating the intermediate gear from the support structure, the electrical insulator material comprising a ceramic material that includes one or more of silicon nitride, zirconium dioxide, aluminum oxide, and sialon.

19. The system of claim 14, wherein the first gear, the intermediate gear, and the second gear are arranged in an epicyclical configuration, the first gear operable as a sun gear, the second gear operable as a ring gear, and the intermediate gear operable as a planetary gear.

20. The system of claim 14, wherein the sensor comprises a first lead operably coupled to the input shaft and a second lead operably coupled to the second gear.

* * * * *